United States Patent
Vogel et al.

(10) Patent No.: US 6,494,494 B2
(45) Date of Patent: Dec. 17, 2002

(54) COUPLING ASSEMBLY

(75) Inventors: Todd J. Vogel, Waterville, OH (US);
David S. Densel, Whitehouse, OH (US); Philip C. VanRiper, Holland, OH (US)

(73) Assignee: Eaton Aeroquip, Inc., Maumee, OH (US)

( * ) Notice: Subject to any disclaimer, the term of this patent is extended or adjusted under 35 U.S.C. 154(b) by 0 days.

(21) Appl. No.: 09/784,258

(22) Filed: Feb. 15, 2001

(65) Prior Publication Data

US 2002/0109350 A1 Aug. 15, 2002

(51) Int. Cl.[7] .............................................. F16L 55/00
(52) U.S. Cl. ..................... 285/39; 285/321; 285/322; 285/323
(58) Field of Search .................... 285/39, 305, 321, 285/322, 323, 12

(56) References Cited

U.S. PATENT DOCUMENTS

| | | | |
|---|---|---|---|
| 3,272,538 A | * 9/1966 | Bergstrom | 285/231 |
| 5,226,682 A | 7/1993 | Marrison et al. | |
| 5,553,895 A | 9/1996 | Karl et al. | 285/39 |
| 5,570,910 A | * 11/1996 | Highlen | 285/308 |
| 6,183,020 B1 | 2/2001 | Luft | 285/93 |

FOREIGN PATENT DOCUMENTS

| | | |
|---|---|---|
| EP | 0905431 A2 | 9/1998 |
| WO | WO 99/01691 | 1/1999 |

\* cited by examiner

Primary Examiner—Eric K. Nicholson
Assistant Examiner—Giovanna Collins
(74) Attorney, Agent, or Firm—Rader, Fishman & Grauer PLLC

(57) ABSTRACT

A coupling assembly for connecting two members is provided that includes a first "male" member and a second "female" member. The first member includes a release sleeve moveably mounted thereon having a rigid release portion and a flexible sealing portion. The second member is integrated into an apparatus, such as a pump, and includes a duct therethrough for receiving the first member. Upon connection of the first and second members, the flexible sealing portion sealingly engages a recessed seat portion of the second member to substantially inhibit the ingression of contaminates into the duct when the first and second members are connected. The foregoing coupling assembly is advantageous because it allows the second member to be formed directly into an apparatus. In other embodiments, the coupling assembly provides an improved release sleeve that releases the male member from both a conventional female member and an integral female member.

23 Claims, 6 Drawing Sheets

COUPLING ASSEMBLY

FIELD OF THE INVENTION

The present invention relates generally to a coupling assembly for connecting two members together and more particularly to a releasable coupling assembly having an integral female member and a movable release sleeve.

BACKGROUND OF THE INVENTION

Coupling assemblies for the transmission of gases or fluids that may be secured together by axial movement of a male member into a female member are known in the art. There are continual efforts to improve upon the current designs of coupling assemblies, particularly to reduce the complexity and cost of the mating members. In a typical application, a male coupling member and female coupling member function as an adapter between a flexible conduit, such as a hose, and an apparatus, such as a pump. While several methods are commonly used to connect the male coupling member to the flexible conduit, such as a barbed hose adapter, the female coupling member is typically connected into a port in the apparatus using a threaded connection. A threaded connection requires the manufacturer to machine a threaded port into their apparatus and to purchase a separate female coupling member designed to engage the threaded port. Manufacturers have attempted to reduce complexity and cost by integrating the female coupling member directly into their apparatus thereby eliminating the need to purchase a separate "independent" female coupling member.

One type of known coupling assembly utilizes an annular locking ring to secure the male coupling member in the female coupling member upon insertion of the male coupling member. The annular locking ring typically engages an outwardly extending rib that may include a tapered ramp and a tapered shoulder. The male coupling member may include a release sleeve moveably mounted thereon for releasing the male member from the female member. A conventional release sleeve typically includes a rigid edge, which upon movement of the release sleeve toward the annular locking ring, forces the locking ring radially outwardly thereby allowing the male coupling member to be disconnected from the female member. Additionally, a conventional release sleeve typically includes a sealing portion that engages an external surface of the female coupling member upon connection with the male coupling member to substantially inhibit the ingression of dust or other contaminates into the area surrounding the annular locking ring. Contamination in the area surrounding the locking ring has been found to significantly reduce the operational life of the coupling assembly.

A key limitation of conventional release sleeves is that they function with either an "integral" female member or an "independent" female member, but not both. In one known release sleeve design, the sealing portion has an axial length sufficient to sealingly engage an exterior cylindrical surface of an "independent" female and to permit sufficient axial movement of the release sleeve toward the female member to engage the locking member. However, this release sleeve is incapable of connecting to an "integral" female member due to the inability of the sealing portion to deform as the male member and release sleeve are moved toward the female member. Therefore, in order to use the foregoing release sleeve design with an "integral" female coupling member, an annular groove is needed in the face of the female member to receive the sealing portion of the release sleeve. A groove of this nature is at best difficult to manufacture, thereby adding cost and complexity to the apparatus.

The inability of the foregoing release sleeve to function with an "integral" female member was addressed in another known release sleeve design. In this design, the axial length of the sealing portion is reduced and the diameter enlarged to permit movement toward an "integral" female member a distance sufficient to connect the coupling members and to cause the rigid edge to expand the locking ring. However, this release sleeve design is incapable of functioning with an "independent" female member due to the insufficient axial length of the sealing portion. In other words, the sealing portion in this design will not sealingly engage the exterior cylindrical sealing surface of an "independent" female member. Accordingly, there exists a need for a release sleeve having a sealing portion that sealingly engages both "independent" and "integral" female coupling members and permits axial movement of the release sleeve a distance sufficient to cause expansion of a locking ring.

In order to reduce complexity and cost, the present invention provides an "integral" female coupling member that may be formed directly into the body of an apparatus, such as a pump. The present invention further provides a release sleeve for releasing a male coupling member from both conventional "independent" female coupling members and "integral" female coupling members.

SUMMARY OF THE INVENTION

The present invention recognizes the aforementioned limitations associated with convention coupling assemblies and provides a coupling assembly that includes a release sleeve that is capable of releasing a male coupling member from both conventional "independent" female members and "integral" female members.

In accordance with an embodiment of the present invention, a coupling assembly for connecting two members is provided that includes a first "male" member and a second "female" member. The first member includes a protrusion having a first and second exterior surface separated by a radially outwardly extending retaining formation. The retaining formation includes an outwardly tapered inclined ramp and an inwardly tapered shoulder meeting at an apex. The first member further includes a release sleeve moveably mounted on the second external surface having a rigid release portion and a flexible sealing portion. The second member is integrated into an apparatus, such as a pump or manifold, and includes a receiving portion therethrough having an inwardly facing annular groove in which is positioned a radially expandable locking member. The second member further includes a recess for receiving the flexible sealing portion of the release sleeve. The flexible sealing portion sealingly engages both the recess of the second member and the second exterior surface of the first member to substantially inhibit the ingression of contaminates into the area surrounding the locking member while the first and second members are connected. Upon insertion of the first member into the receiving portion of the second member, the locking member is forced to expand over the outwardly tapered inclined surface of the receiving portion on the first member. Once over the apex, the locking member contracts to engage the tapered shoulder of the rib to positively retain the first member in the second member. The release sleeve further includes a rigid release portion that, upon movement of the release sleeve toward the locking member, forces the locking member to expand over the apex to permit the first member to be disconnected from the second member. The foregoing coupling assembly is advantageous because it allows the "integral" female member to be formed directly into an apparatus, such as a pump or manifold. In other embodiments of the invention, the coupling assembly provides a release sleeve that releases the male member from both conventional "independent" female members and the "integral" female members.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
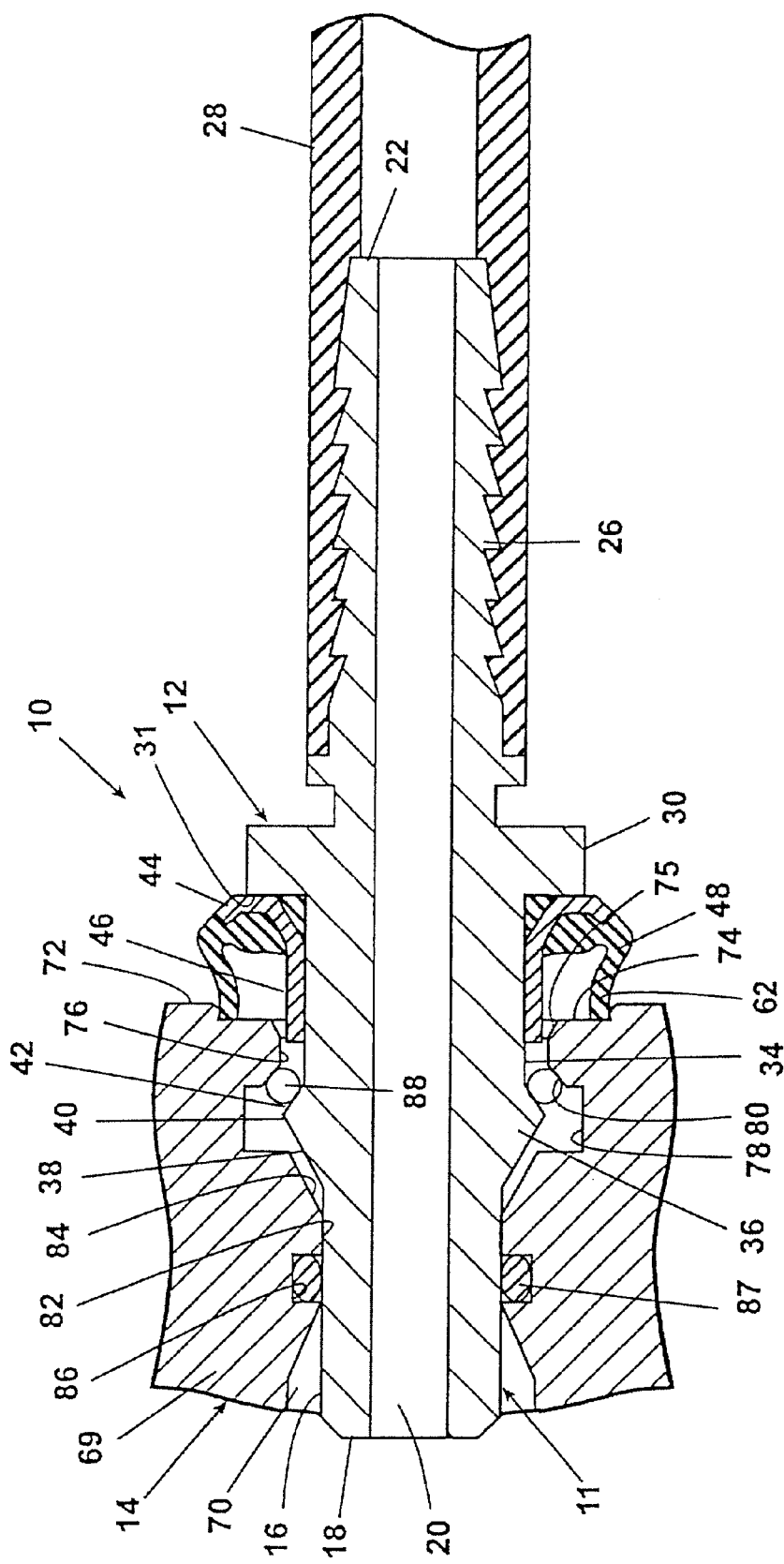
FIG. 1 is a cross-sectional view of an embodiment of the present invention illustrating the coupling members in the connected position.

Referring now to the drawings, the preferred embodiments of the present invention are described in detail. Referring to FIG. 1, a preferred embodiment of a coupling assembly 10 is shown that includes a first member 12 and a second member 14 shown in the connected configuration. Members 12 and 14 preferably have a generally tubular shape. First member 12, which functions as the "male" member of coupling assembly 10, includes a protrusion 11 having a first exterior surface 16 adjacent an engagement end 18 for insertion into second member 14. First member 12 further includes a duct 20 extending therethrough from an engagement end 18 to an attachment end 22. If desired, attachment end 22 of first member 12 may be provided with a barbed hose adapter 26 or other suitable connection means for fastening to a separate member 28, such as a flexible conduit or hose. First member 12 preferably includes a smooth cylindrical surface 30 extending radially outwardly from first member 12. Alternatively, at least two flats for engagement by a wrench may be formed into cylindrical surface 30 if attachment end 22 is provided with external threads as the connection means. A support surface 31 is positioned substantially perpendicular to cylindrical surface 30. Adjacent to support surface 31, is located a second exterior surface 34 which is separated from first exterior surface 16 by a retaining formation 36. The retaining formation 36 preferably includes a ramp 38 tapering outwardly from first exterior surface 16 in a direction away from engagement end 18. Ramp 38 extends to an apex 40 where it meets a shoulder 42 that tapers inwardly to second exterior surface 34. Alternatively, ramp 38 may extend to a cylindrical surface (not illustrated) that is substantially parallel to second exterior surface 34 and extends away from ramp 38 until it meets shoulder 42.

Figure 3:
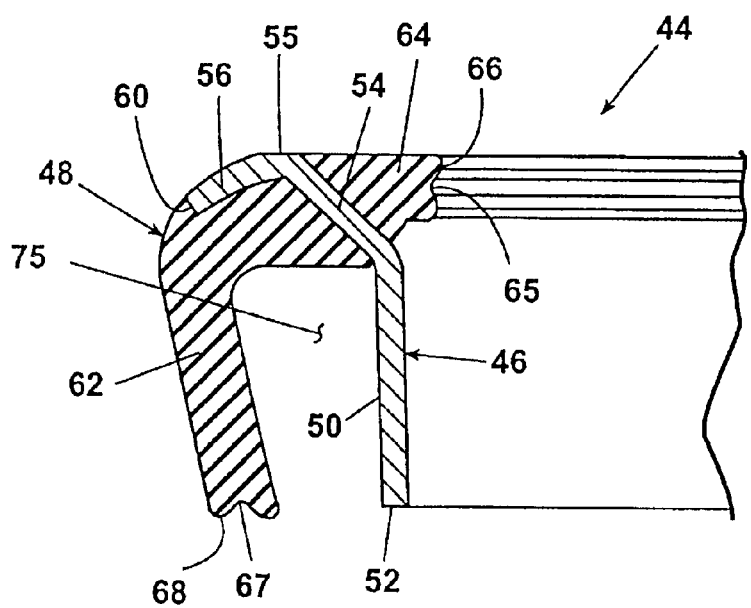
FIG. 3 is a sectional view of the release sleeve along the plane indicated by 3—3 in FIG. 2.
Figure 4:
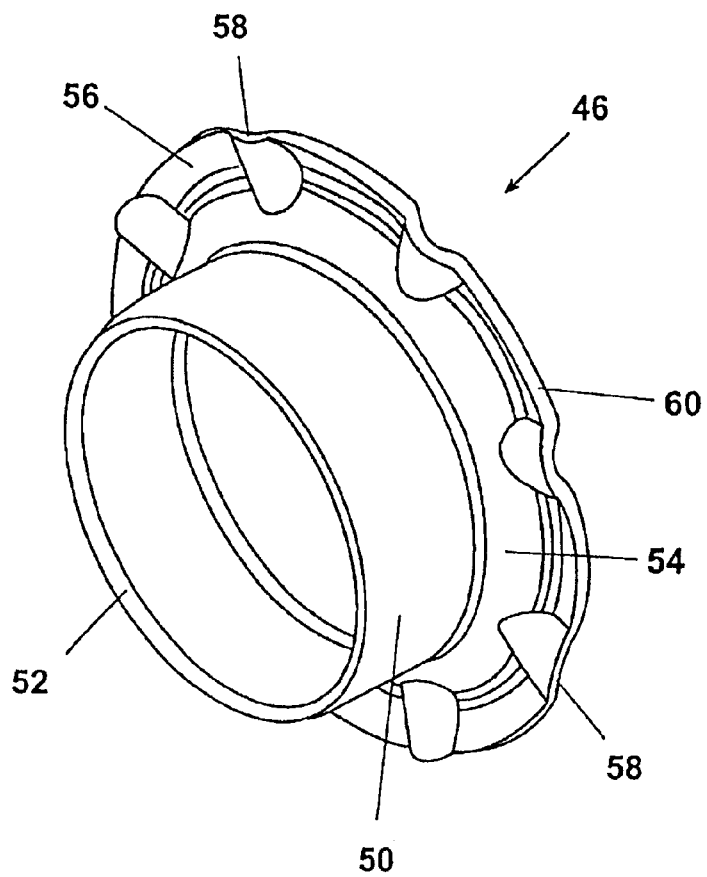
FIG. 4 is a perspective view of a rigid release portion of the release sleeve of FIG. 2.

A release sleeve 44 may be moveably mounted on the second exterior surface 34 of first member. Release sleeve 44 includes an annular rigid release portion 46 and a flexible sealing portion 48. As shown in FIGS. 3 and 4, rigid release portion 46 includes a generally cylindrical wall portion 50 that extends from a leading edge 52 to an outwardly radially extending, preferably tapered, wall portion 54. In a preferred embodiment, the wall portion 54 terminates into a flat 55 having a generally downwardly sloping flange portion 56. When it is desired to move release sleeve 44 on first member 12, a tool (not illustrated) may be used for additional leverage between flat 55 and support surface 31. Flange portion 56 provides a guide to direct the insertion of the tool in between flat 55 and support surface 31. As better illustrated in FIGS. 3 and 4, flange portion 56 may include a plurality of impressions 58 beginning at a radially outer terminal edge 60 of flange portion 56, such impressions extending radially inwardly through flat 55 into tapered wall portion 54. Release sleeve 44 is preferably secured to first member 12 by annularly reducing or "crimping" wall portion 50 around second exterior surface 34. Alternatively, rigid release portion 46 may be non-continuous having a split from leading edge 52 through edge 60 of flange portion 56, thereby allowing rigid release portion 46 to expand over retaining formation 36 during assembly onto first member 12.

Figure 2:
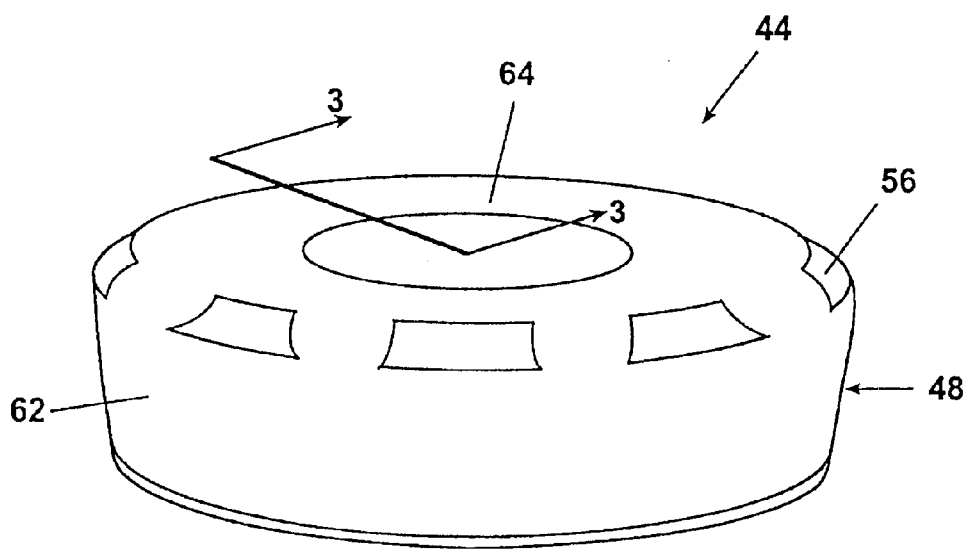
FIG. 2 is a perspective view of a release sleeve.

Referring to FIGS. 2 and 3, sealing portion 48 preferably comprises a polymeric material having an elastomeric and/or thermoplastic base polymer, such as Hydrogenated Nitrile-Butadiene Rubber (HNBR). However, the present invention is not limited to such polymeric material and other materials providing similar structure and functionality may also be used.

Sealing portion 48 includes a generally bulbous or bell-shaped, preferably radially inwardly sloping, wall portion 62, and an annular fin portion 64 located radially inwardly of tapered wall portion 54. Fin portion 64 sealingly engages second exterior surface 34 and/or support surface 31 of first member 12 to substantially inhibit the ingression of dust or other contaminates into the coupling assembly while first member 12 and second member 14 are connected. As illustrated in FIG. 3, an inside diameter 65 of fin portion 64 may include at lease one sealing bead 66. Similarly, a distal end 67 of inwardly sloping wall portion 62 may include at least one distal sealing bead 68, however a plurality of distal sealing beads is preferred. Sealing bead 66 reduces the drag of fin portion 64 against first member 12 as release sleeve 44 moves on first member 12. Distal sealing bead 68 reduces the axial force needed to sealingly engage second member 14 when first member 12 is connected to second member 14.

Sealing portion 48 is generally molded around tapered wall portion 54, flat 55 and flange portion 56. A chemical compound, such as an adhesive, may be incorporated into the polymeric material or applied directly to rigid release portion 46 before the molding operation to chemically attach sealing portion 48 to rigid release portion 46. The geometry of tapered wall portion 54 is designed to allow space for fin portion 64. However, it is recognized that other contours of tapered wall portion 54 that provide suitable space for fin portion 64 may be used. During the process of molding sealing portion 48 around tapered wall portion 54, flat 55 and flange portion 56, polymeric material will flow into impressions 58, as shown in FIG. 2. Impressions 58 facilitate material flow between opposite sides of tapered wall portion 54 to allow sealing portion 48 to remain one continuous member. In addition, impressions 58 permit sealing portion 48 to be attached to rigid release portion 46 without encapsulating flat 55 within sealing portion 48. A greater mechanical advantage may be realized when a tool is used as leverage between the rigid flat 55 and support surface 31 if flat 55 is not covered by sealing portion 48. However, it is recognized that sealing portion 48 may encapsulate flat 55 when an increase in mechanical advantage is not required.

Referring again to FIG. 1, second member 14 generally functions as the "female" member of coupling assembly 10 and is designed to receive a portion of the first member 12. In a preferred embodiment, second member 14 is formed into an apparatus, such as a pump or manifold. Second member 14 may be formed, for example, by machining, molding or casting the profile of second member 14 directly into a body 69 of an apparatus. Second member 14 includes a receiving portion 70, such as a duct, therethrough that extends from a receiving end 72. Receiving end 72 preferably includes a recess 74 that cooperates with bulbous wall portion 62 of release sleeve 44 in both an axial and radial direction to substantially inhibit the ingression of dust or other contaminates into receiving portion 70. Recess 74 provides a finished surface having a quality suitable for sealingly engaging bulbous wall portion 62. However, a recess is not necessarily needed if the surface quality of receiving end 72 is suitable for sealingly engaging bulbous wall portion 62 and, in addition, the benefit of a radial seal is not required.

A first chamfer 75 extends inwardly from recess 74 to a first interior cylindrical surface 76. Cylindrical surface 76 includes a first inwardly facing annular groove 78 extending radially outwardly therefrom. A second chamfer 80 extends inwardly from first annular groove 78 toward receiving end 72 until it meets first interior cylindrical surface 76. Second member 14 preferably includes a second interior cylindrical surface 82 that is joined to first annular groove 78 by a tapered wall portion 84. The inside diameter of second interior cylindrical surface 82 is slightly larger than the outside diameter of first exterior surface 16 on first member 12 to allow first member 12 to be received within receiving portion 70. The second interior cylindrical surface 82 preferably has formed therein a second inwardly facing annular groove 86 in which is positioned an annular sealing element 87, such as an o-ring.

Received in first annular groove 78 is an annular locking member 88 preferably formed of a metal, and more preferably stainless steel. In a preferred embodiment the metal of locking member 88 is spring tempered so that locking member 88 has flexibility to expand and return to its original shape. Preferably, locking member 88 is not continuous, but includes a space between two ends (not illustrated) thereby allowing locking member 88 to expand and contract without altering its annular shape. While first member 12 is disconnected from second member 14, locking member 88 has an external diameter less than the inside diameter of first annular groove 78 but larger than the diameter of first internal cylindrical surface 76. Additionally, locking member 88 has an internal diameter substantially equal to or, preferably slightly smaller than that of second exterior surface 34 on first member 12 allowing locking member 88 to tightly engage first member 12 when connected to second member 14.

Figure 5:
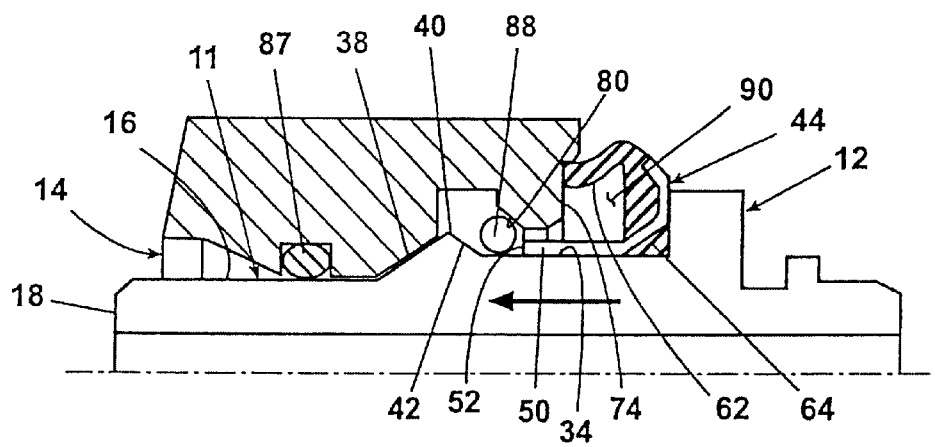
FIG. 5 is a partial side elevational view of an embodiment of the present invention illustrating the coupling members in the connected configuration.

Referring to FIG. 5, as first member 12 is inserted into second member 14, engagement end 18 and first exterior surface 16 pass through the inside diameter of locking member 88 until ramp 38 reaches locking member 88. Upon further insertion, locking member 88 is forced to travel up ramp 38 thereby expanding locking member 88 until it reaches apex 40. As apex 40 moves past locking member 88, the resilience of the metal contracts locking member 88 as it travels down shoulder 42, until it contacts second exterior surface 34. Upon complete insertion of first member 12 into second member 14, locking member 88 is positioned substantially between shoulder 42, chamfer 80 and second exterior surface 34. Movement of first member 12 in a direction away from second member 14 forces locking member 88 to engage both shoulder 42 and chamfer 80 thereby preventing the removal of first member 12 from second member 14.

Referring still to FIG. 5, upon complete insertion of first member 12 into second member 14, first exterior surface 16 sealingly engages annular sealing element 87 to prevent leakage of a fluid. Additionally, bulbous wall portion 62 and fin portion 64 of release sleeve 44 sealingly engage recess 74 and second exterior surface 34 respectively to substantially inhibit the ingression of dust or other contaminates into the area surrounding locking member 88. The preferably radially inwardly sloping geometry of bulbous wall portion 62 and the flexible material properties of sealing portion 48 allow bulbous wall portion 62 to deform as it engages recess 74. The ability of bulbous wall portion 62 to deform upon engagement with recess 74 provides the advantage of lowering the axial force needed to insert first member 12 into second member 14. In addition, the flexible properties and geometry of sealing portion 48 permit axial movement of release sleeve 44 on first member 12 during insertion into second member 14 without losing a seal. Axial movement of release sleeve 44 may be caused by vibration, impulse pressure loading, or by the operator during disconnection of first member 12 from second member 14, as described below.

Figure 6:
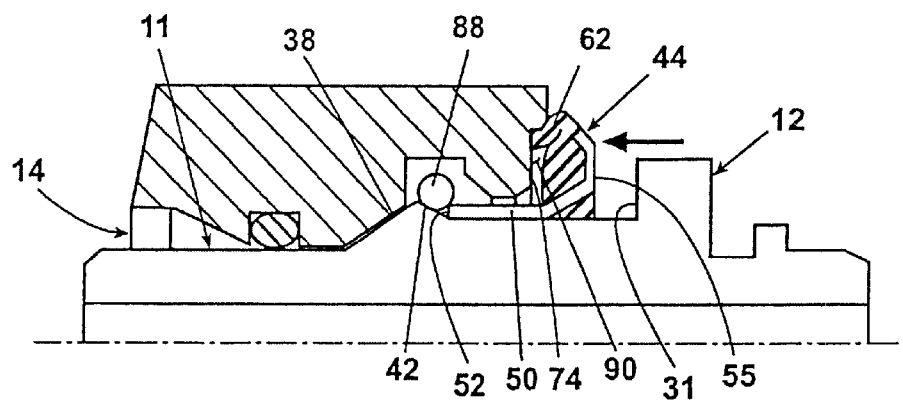
FIG. 6 is a partial side elevational view illustrating the relative position of the parts upon movement of the release sleeve to a position causing the locking ring to be moved to the release position.
Figure 7:
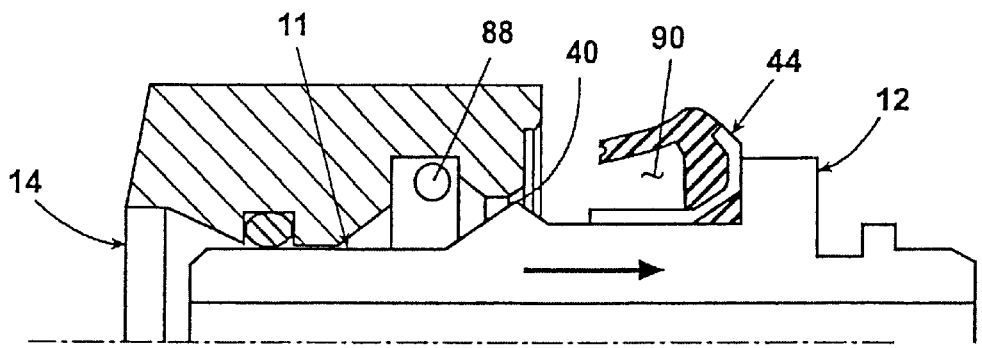
FIG. 7 is a partial side elevational view illustrating the relative position of the parts upon disengagement of the first member from the second member.

Referring now to FIG. 6, when it is desired to disconnect first member 12 from second member 14, release sleeve 44 is moved in a direction towards second member 14. As described above, a tool may used for additional leverage between support surface 31 and release sleeve 44. In most instances the use of a tool to move release sleeve 44 is required due to the relatively large force needed to expand locking member 88 during connection. Cylindrical wall portion 50 of rigid release portion 46 and bulbous wall portion 62 of sealing portion 48 cooperate to define a gap 90 therebetween. Gap 90 cooperates with recess 74 in second member 14 to provide an area for deformation of bulbous wall portion 62. Upon movement of release sleeve 44 towards second member 14, bulbous wall portion 62 of flexible sealing member 48 collapses on itself, allowing the leading edge 52 of cylindrical wall portion 50 in release sleeve 44 to engage locking member 88. Cylindrical wall portion 50 forces locking member 88 axially towards tapered shoulder 42, whereby tapered shoulder 42 forces locking member 88 to expand or, alternatively, wall portion 50 slides under locking member 88 to force the expansion of locking ring 88. As seen in FIG. 7, when the inside diameter of locking member 88 is expanded to a diameter greater than the diameter of apex 40, first member 12 will be release from second member 14 and is free to be removed therefrom.

Figure 8:
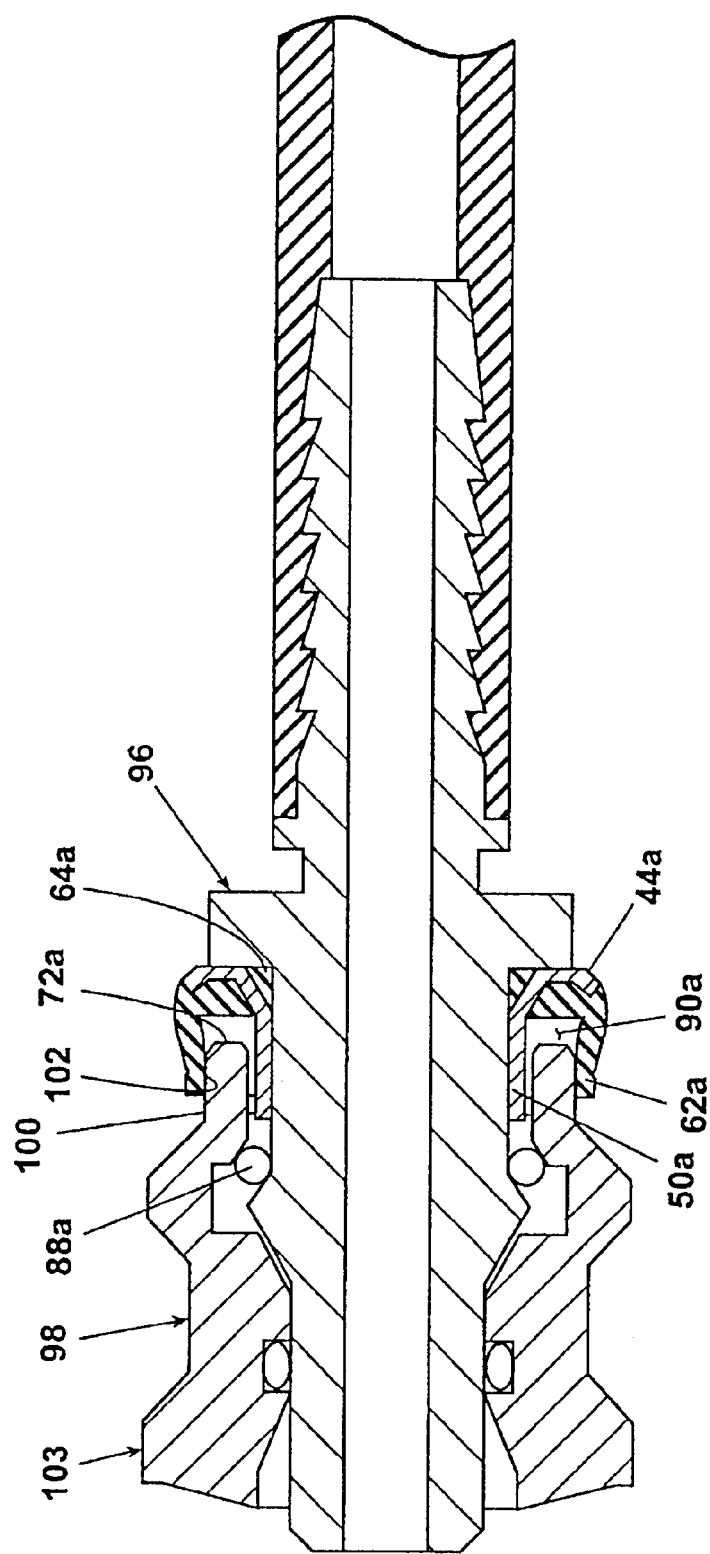
FIG. 8 is a cross-sectional view of another embodiment of the present invention illustrating the coupling members in the connected position.

Referring to FIG. 8, there is shown another embodiment of the coupling assembly that includes a male member 96 and a female member 98. In this embodiment, the male member 96 and release sleeve 44a are substantially similar to first member 12 and release sleeve 44 in the preferred embodiment. Female member 98 is substantially similar to second member 14 in the preferred embodiment with at least one exception, namely, the body of female member 98 is independent from the apparatus in which it is received. When male member 96 is engaged in female member 98, receiving end 72a and portions of female member 98 adjacent thereto are positioned in a gap 90a created between a cylindrical wall portion 50a and a bulbous wall portion 62a. An exterior cylindrical surface 100 of female member 98 is sealably engaged with the inside surface 102 of an bulbous wall portion 62a of release sleeve 44a to substantially inhibit, along with a fin potion 64a, the ingression of dust or other contaminates into the area surrounding locking member 88a when the members are engaged. Female member 98 further includes an attachment end (not illustrated), such as a threaded connection, for securing female member 98 to an apparatus. At least two flats 103 for engagement by a wrench may be provided to secure female member 98 to an apparatus, such as a pump or manifold.

Figure 9:
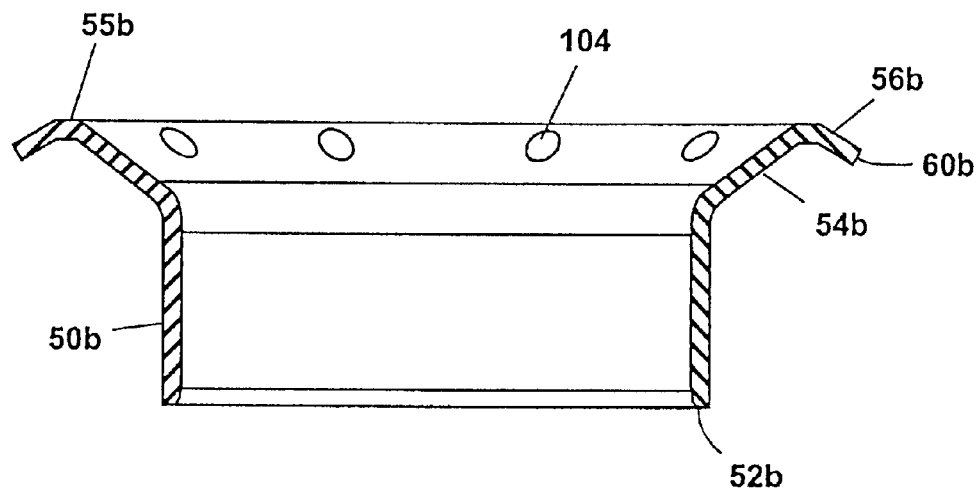
FIG. 9 is a cross-sectional view of a second embodiment of the rigid release portion.

Referring to FIG. 9, there is shown another embodiment of the rigid release portion having a cylindrical wall portion 50b extending from a leading edge 52b to an outwardly radially extending, preferably tapered, wall portion 54b. Wall portion 54b terminates into a flat 55b having a generally downwardly sloping flange portion 56b. Wall portion 54b includes a plurality of apertures 104 therethrough. During the process of molding sealing potion 48 around wall portion 54b and flange portion 56b, polymeric material will flow through apertures 104 uniting bulbous wall portion 62 and fin portion 64 of sealing portion 48 as described above and shown in FIG. 3. The use of apertures 104 is advantageous because it allows sealing portion 48 to remain one continuous member. In addition, apertures 104 permit sealing portion 48 to be attached to the rigid release portion without encapsulating flat 55b within sealing portion 48. As with the preferred release sleeve 44, a greater mechanical advantage may be realized when a tool is used as leverage between the rigid flat 55b and support surface 31 if flat 55b is not covered by flexible sealing portion 48. However, it is recognized that sealing portion 48 may encapsulate flat 55b when an increase in mechanical advantage is not required. The resulting alternate embodiment of release sleeve 44 is preferably secured to first member 12 by annularly reducing or "crimping" wall portion 50b around second exterior surface 34 of first member 12. Alternatively, the rigid release portion may be split from a leading edge 52b through a terminal edge 60b in flange portion 56b allowing the rigid release portion to expand during assembly on first member 12.

Figure 10:
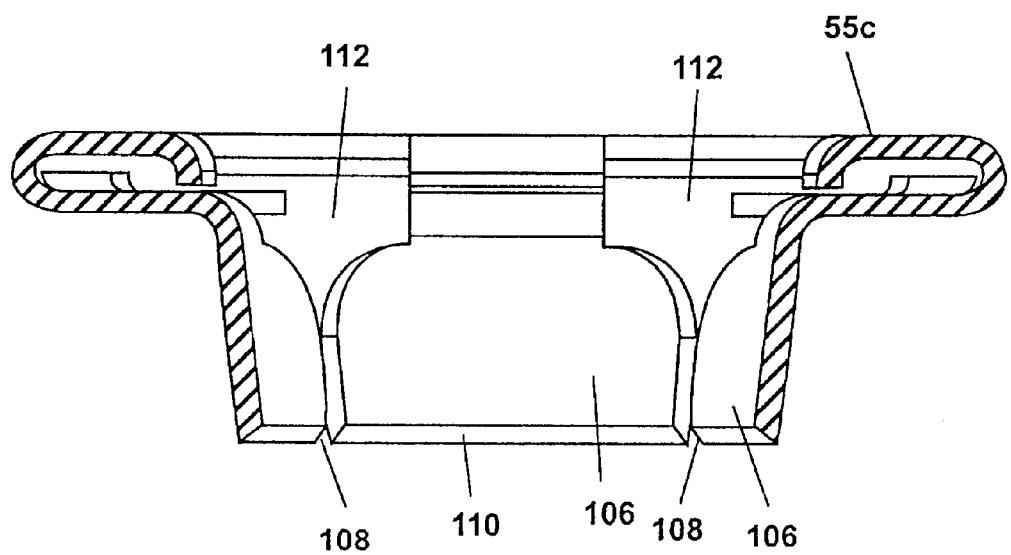
FIG. 10 is a cross-sectional view of a third embodiment of the rigid release portion.

Referring to FIG. 10, there is shown a further embodiment of the annular rigid release portion, in which is provided a flat surface 55c having a plurality of integral release members 106. Release members 106 have therebetween a plurality of slots 108 extending from a leading edge 110 into a plurality of apertures 112. During the process of molding sealing potion 48 around flat 55c, polymeric material will flow through apertures 112 uniting bulbous wall portion 62 and fin portion 64 of sealing portion 48 as described above and shown in FIG. 3. The use of apertures 112 is advantageous because it allows sealing portion 48 to remain one continuous member. In addition, apertures 112 permit sealing portion 48 to be attached to the rigid release portion without encapsulating flat 55c within sealing portion 48. As with the preferred release sleeve 44, a greater mechanical advantage may be realized when a tool is used as leverage between the rigid flat 55c and support surface 31 if flat 55c is not covered by sealing portion 48. However, it is recognized that sealing portion 48 may encapsulate flat 55c when an increase in mechanical advantage is not required. Moreover, this embodiment is advantageous because it allows release members 106 to expand over retaining formation 36 on first member 12 during attachment thereto.

Accordingly, the present invention provides a male coupling member having a universal release sleeve that, unlike the prior art, can be used to sealingly engage both "independent" and "integral" female coupling members. When used in conjunction with an "integral" female coupling member, the release sleeve of the present invention sealingly engages a recess in the face of the female member to seal in both an axial and a radial direction. The release sleeve includes a flexible sealing portion capable of deformation to permit movement of the release sleeve a distance sufficient to cause the rigid release member to expand the locking ring. Moreover, the flexible material properties and bulbous geometry of the flexible sealing member reduce the axial force needed to connect the male coupling member in the "integral" female coupling member. When used in conjunction with an "independent" female member, an inside surface of the flexible sealing portion sealingly engages an exterior surface of the female member to seal in a radial direction.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A release sleeve suitable for movable mounting on a first coupling member to release the first coupling member from one of an integral second coupling member and an independent second coupling member, said release sleeve comprising:

a rigid release portion that includes a generally cylindrical wall portion extending from a leading edge to an outwardly extending wall portion, said outwardly extending wall portion terminating into a flat having a flange portion, said flange portion having a radially outer terminal edge; and a flexible sealing portion attached to said rigid release portion, said flexible sealing portion including a fin portion that sealingly engages a surface of the first coupling member and a bulbous portion capable of sealingly engaging both a surface of the integral second coupling member and a surface of the independent second coupling member to substantially inhibit the ingression of contaminants into an area between the first and second coupling members when connected.

2. A release sleeve according to claim 1, wherein a distal end of said bulbous portion includes at least one bead.

3. A release sleeve according to claim 1, wherein an inside diameter of said fin portion includes at least one bead.

4. A release sleeve according to claim 1, wherein said flexible sealing portion comprises a polymeric material.

5. A release sleeve according to claim 4, wherein a chemical compound is used to promote chemical adhesion of said flexible sealing portion to said rigid release portion.

6. A release sleeve according to claim 1, wherein said flexible sealing portion is molded around said rigid release portion.

7. A release sleeve according to claim 1, wherein said rigid release portion includes a plurality of impressions extending radially inwardly from said terminal edge through said flat.

8. A release sleeve according to claim 7, wherein said flexible sealing portion flows through said impressions during molding such that said flexible sealing portion comprises a substantially continuous member.

9. A release sleeve according to claim 1, wherein said outwardly extending wall portion includes a plurality of apertures.

10. A release sleeve according to claim 1, wherein said rigid release portion is not continuous, but includes a split extending from said leading edge to said terminal edge to allow said rigid release portion to expand during assembly onto the first coupling member.

11. A release sleeve suitable for movable mounting on a first coupling member to release the first coupling member from one of an integral second coupling member and an independent second coupling member, said release sleeve comprising:
 a rigid release portion that includes a flat having a plurality of integral release members extending therefrom, said release members separated by a plurality of slots extending from a leading edge into a plurality of apertures; and
 a flexible sealing portion attached to said rigid release portion, said flexible sealing portion including a fin portion that sealingly engages a surface of the first coupling member and a bulbous portion capable of sealingly engaging both a surface of the integral second coupling member and a surface of the independent second coupling member to substantially inhibit the ingression of contaminants into an area between the first and second coupling members when connected.

12. A coupling assembly for connecting two members comprising:
 a first member having a protrusion that includes at least one exterior surface, said at least one exterior surface being adjacent a retaining formation;
 one of an integral second member formed in an apparatus and an independent second member, each of said integral second member and said independent second member including a portion for receiving said protrusion of said first member and a locking member, said integral second member further including a receiving end having a recess, said independent second member including a receiving end having an external cylindrical surface;
 a release sleeve moveably mounted on said first member; said release sleeve including a flexible sealing portion and a rigid release portion, said flexible sealing portion having a bulbous portion capable of sealingly engaging said recess of said integral second member and said exterior cylindrical surface of said independent second member;
 wherein, when said first member is connected to said integral second member, said bulbous portion is capable of collapsing on itself upon engagement with said recess to permit connection of the members and to sealingly engage said recess in an axial direction to inhibit the ingression of contaminants into an area between said first member and said integral second member; and
 wherein, when said first member is connected to said independent second member, said bulbous portion sealingly engages said exterior cylindrical surface in a radial direction to inhibit the ingression of contaminants into the area between said first member and said independent second member;
 whereby, when said first member is inserted into said integral second member, said at least one exterior surface passes through said locking member where, upon further insertion, said locking member is expanded over said retaining formation until it clears said retaining formation whereby, said locking member contracts to a position between said first member and said second member to interconnect the members, and
 whereby, when said first member is disconnected from said second member, said rigid release portion engages said locking member such that said locking member is forced to expand over said retaining formation allowing said first member to be removed from said second member.

13. A coupling assembly according to claim 12, wherein said retaining formation includes a tapered ramp and shoulder.

14. A coupling assembly according to claim 12, wherein said receiving portion includes a first inwardly facing groove for receiving therein said locking member.

15. A coupling assembly according to claim 12, wherein said receiving portion includes a second inwardly facing groove for receiving therein an annular sealing element.

16. A coupling assembly according to claim 12, wherein said first member includes a duct therethrough extending from an engagement end to an attachment end.

17. A coupling assembly according to claim 12, wherein said attachment end includes a hose adapter.

18. A coupling assembly according to claim 12, wherein said attachment end is threaded.

19. A coupling assembly according to claim 12, wherein said rigid release portion includes a cylindrical wall portion extending from a leading edge to an outwardly extending wall portion, said outwardly extending wall portion terminating into a flat having a flange portion, said flange portion having a radially outer terminal edge.

20. A coupling assembly according to claim 19, wherein said rigid release portion includes a plurality of impressions extending radially inwardly from said terminal edge through said flat.

21. A coupling assembly according to claim 12, wherein said flexible sealing portion further includes a fin portion that cooperates with said first member to inhibit the ingression of contaminants into an area between said first and second coupling members.

22. A coupling assembly according to claim 12, wherein said locking member is not continuous, but includes a space between two ends to allow said locking member to expand and contract.

23. A coupling assembly for connecting two members comprising:
 a first member having a protrusion that includes a retaining formation;
 one of an independent second member and an integral second member each including a portion for receiving said protrusion of said first member and locking with said retaining formation, said independent second member further including a receiving end having an radial sealing surface, said integral second member further including a receiving end having an axial sealing surface;

a release sleeve moveably mounted on said first member; said release sleeve including a flexible sealing portion and a rigid release portion, said flexible sealing portion having a bulbous portion capable of sealingly engaging said radial sealing surface of said independent second member and said axial sealing surface on said integral second member;

wherein, when said first member is connected to said independent second member, said bulbous portion sealingly engages said radial sealing surface in a radial direction to inhibit the ingression of contaminants into an area between said first member and said independent second member; and wherein, when said first member is connected to said integral second member, said bulbous portion sealingly engages said axial sealing surface in an axial direction to inhibit the ingression of contaminants into an area between said first member and said independent second member.

* * * * *